United States Patent [19]

Hashimoto et al.

[11] Patent Number: 4,707,129
[45] Date of Patent: Nov. 17, 1987

[54] THREE DIMENSIONAL POSITION MEASUREMENT SYSTEM USING AN INTERFEROMETER

[75] Inventors: Ichiro Hashimoto, Hachioji; Katsushige Nakamura, Mitaka, both of Japan

[73] Assignee: Hewlett-Packard Company, Palo Alto, Calif.

[21] Appl. No.: 733,558

[22] Filed: May 10, 1985

[30] Foreign Application Priority Data

May 11, 1984 [JP] Japan .................................. 59-93929

[51] Int. Cl.⁴ .............................................. G01B 9/02
[52] U.S. Cl. ..................................... 356/4.5; 356/358; 356/363
[58] Field of Search ........................................ 356/4–5, 356/358, 363

[56] References Cited

U.S. PATENT DOCUMENTS 3,458,259  1/1969  Bagley et al. .
3,715,599  2/1973  Marcy ............................. 356/363 X
3,788,746  1/1974  Baldwin et al. .
4,457,625  7/1984  Greenleaf et al. ................ 356/4.5 X

OTHER PUBLICATIONS

Watson, John T., The Itek Contour Measuring Interferometer.

Primary Examiner—Davis L. Willis
Assistant Examiner—Matthew W. Koren
Attorney, Agent, or Firm—John A. Frazzini

[57] ABSTRACT

An interferometer having a beam generating section and a reflecting section. Mechanisms are provided to direct a beam from the generating section to the reflecting section even when the reflecting section moves freely in three dimensions. Mechanisms are also provided to direct the beam back from the reflecting section to the generating section even when the reflecting section moves freely in three dimensions. A method is presented that enables the absolute distance between the generating and reflecting sections to be determined.

13 Claims, 21 Drawing Figures

THREE DIMENSIONAL POSITION MEASUREMENT SYSTEM USING AN INTERFEROMETER

BACKGROUND OF THE INVENTION

The disclosed invention relates in general to position measurement systems and more particularly to a position measurement system that can measure absolute positions in three dimensions. It is well known that an interferometer can be used to accurately measure movement in one dimension as is utilized in applications such as the manufacture of integrated circuits. A suitable interferometer for such applications is presented in U.S. Pat. No. 3,458,259, issued to A. S. Bagley et. al. on July 29, 1969 and assigned to Hewlett-Packard Company. In this interferometer, a reflector (e.g., a cube corner) is mounted onto a movable component whose position is to be monitored. A portion of a laser beam produced by a laser head is reflected from the reflector back to the interferometer to enable measurement of the distance moved by this movable component.

Another suitable interferometer, presented in U.S. Pat. No. 3,788,746 entitled Optical Dilatometer issued to Richard R. Baldwin and Bruce J. Ruff on Jan. 29, 1974, is illustrated in FIG. 20. In that interferometer, a light source 2010 produces a first beam 2012 that is divided by a polarizing beam splitter 2060 into a reference beam 2050 and a test beam 2016. The reference beam travels along a reference path AGHF and the test beam travels along a test path ABCDEF that reflects off of a movable reflector 2015 at point B. In that particular interferometer, the test beam is also reflected off reflector 2015 at point E. At point F the reference and test beams are recombined to form an interfering output beam 2016.

The following disadvantages exist in such an interferometer system. First, since the reflecting mirror must always be located along the axis of the laser beam, the mirror cannot be moved freely in three dimensions, but instead is limited to 1-dimensional motion. Second, since the Doppler effect is utilized to measure distances, the distance moved by the movable component can be measured, but the absolute distance from the laser head to the movable component cannot be measured. Third, the movable component is moved only in response to control instruction (e.g., commands from a computer). Fourth, a time consuming alignment is required to ensure that the laser beam is accurately incident on the laser throughout the range of motion of the movable component.

The present invention addresses the disadvantages in the system discussed above and is suitable for making both relative and absolute measurements of position of a system component that is freely movable in three dimensions.

SUMMARY OF THE INVENTION

In accordance with the disclosed preferred embodiment, a position measurement system is presented that utilizes a collimated, coherent light source, such as a laser, and a reflector mounted on a movable component whose position is to be measured. Servo controls on both the laser and the reflector are included to enable the system to operate even when the movable component is moved freely in three dimensions. The system provides measurements of absolute position of the movable component in addition to measurements of a change in position of the movable component.

The system utilizes a light beam generating section and a light beam reflecting section. The light beam generating section includes a primary laser head, an auxiliary laser head, an optical detector, a primary interferometer and angle encoders, all of which are mounted on a first 2-axis gimbal. The light beam reflecting section includes a reflector and an optical detector, both of which are mounted on a second 2-axis gimbal. For the primary interferometer to accurately and reproducibly measure the change in distance between the reflector and primary interferometer, the generating section and reflecting section must be oriented so that the laser beam is accurately directed from the generating section to the reflecting section and back to the generating section. When this occurs, these two sections are said to be "aligned". Both gimbals are driven by motors that are under control of servo loops to preserve alignment between the generating section and the reflecting section even when the reflector is moved freely in three dimensions.

The interferometer enables measurement of a change in distance between the primary interferometer and the reflector to be determined. The angle encoders are used to measure the absolute angles defining the direction from the interferometer to the reflector. In order to determine the absolute position of the reflector, the absolute distance between the interferometer and the reflector must be determined. To measure this absolute distance, the reflector is moved a distance L from a first point A to a second point B. The distance L is measured by a distance measuring apparatus such as a secondary laser/interferometer system. The angle $\phi$ subtended at the interferometer between points A and B is measured by the angle encoders. Point B is chosen to lie at the same distance from the primary interferometer as point A so that both points are at a common distance R from the interferometer. This enables R to be determined from the values of L and $\phi$. Once R is known for points A and B, the absolute position is determined from R and the change in angles and distances measured by the angle encoders and the primary interferometer.

DESCRIPTION OF THE PREFERRED EMBODIMENT

Figure 1:
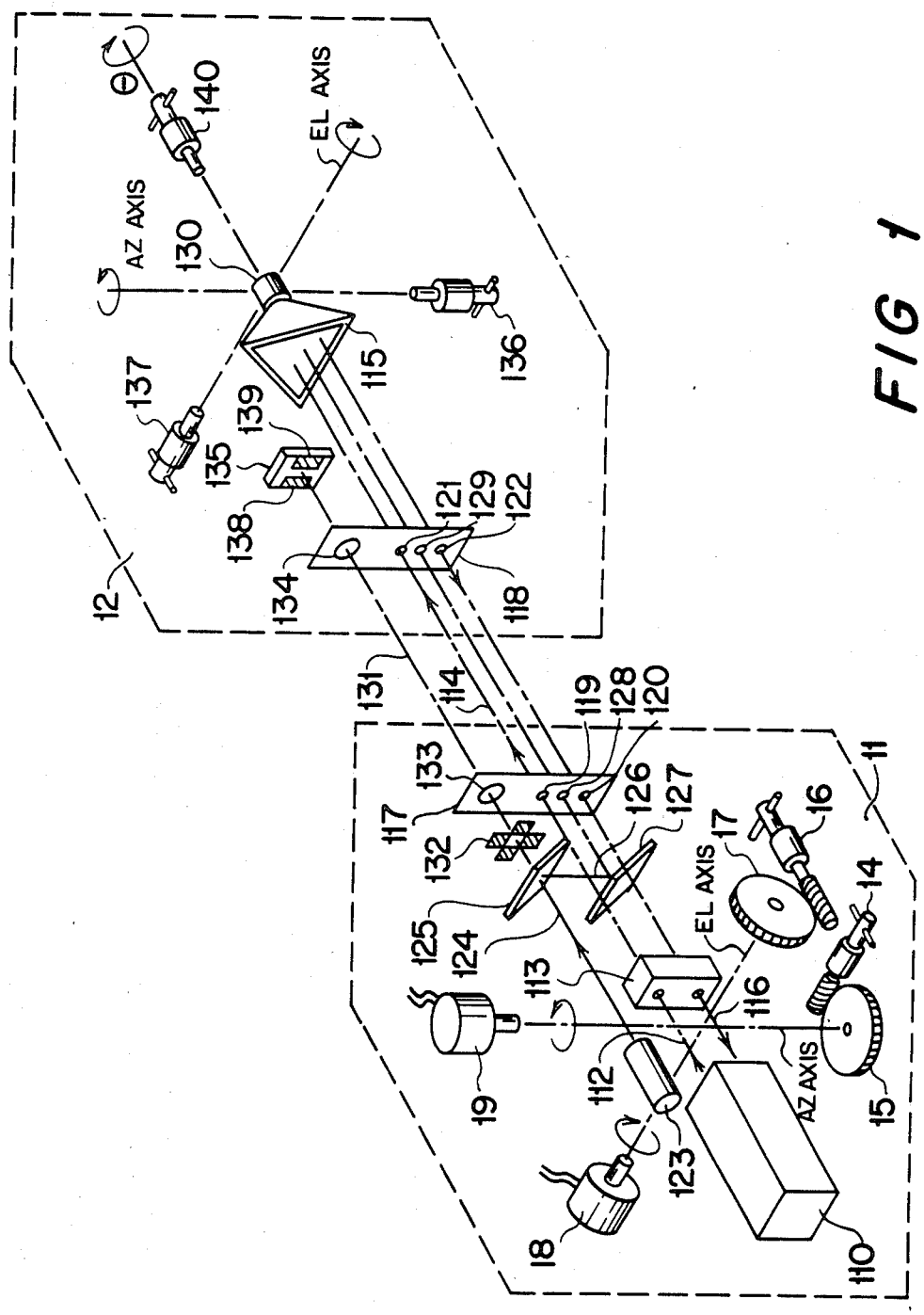
FIG. 1 is an exploded diagram of the interferometer system of this invention illustrating its light beam generating section and its light beam reflecting section.

In the following discussion, the first digit of each two or three digit reference numeral in a figure indicates the first figure in which the element associated with that reference numeral is shown. The first two digits of four digit reference numerals indicate the first figure in which the associated element is shown. In general, analogous elements in different figures will have reference numerals that differ only in the first digit.

Figure 2:
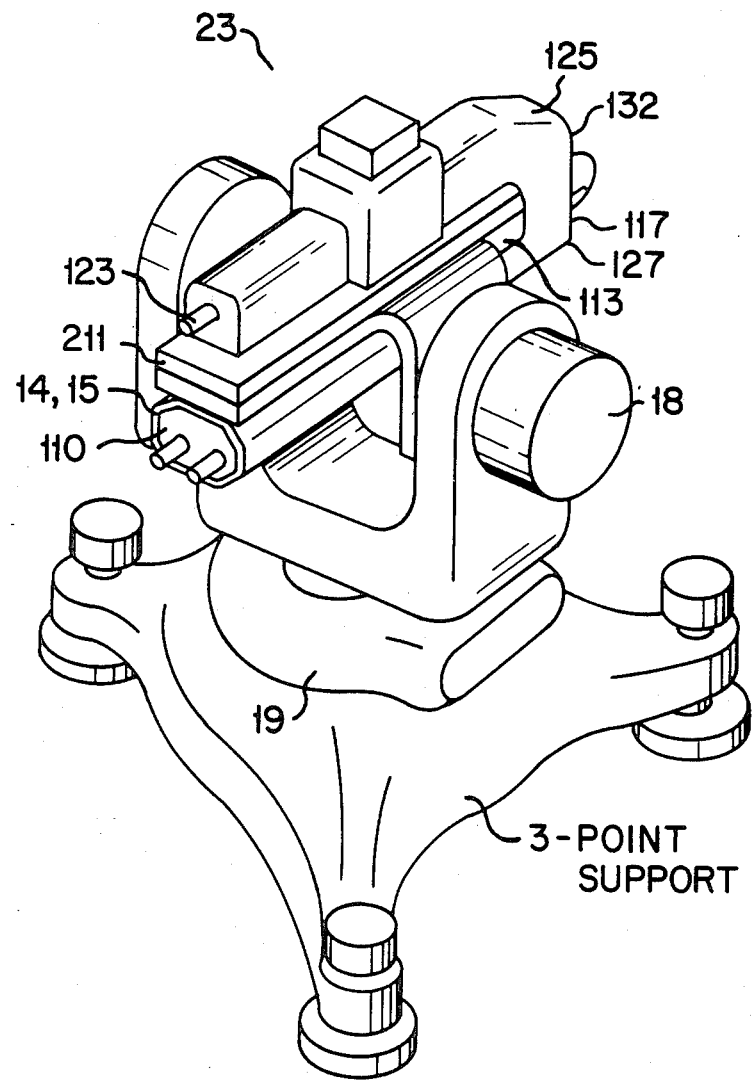
FIG. 2 is a perspective diagram of the light beam generating section.
Figure 3:
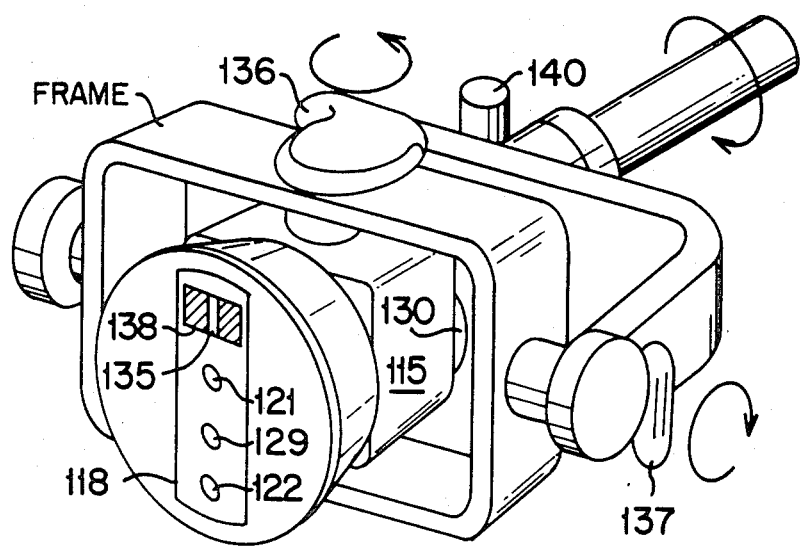
FIG. 3 is a perspective diagram of the light beam reflecting section.
Figure 4:
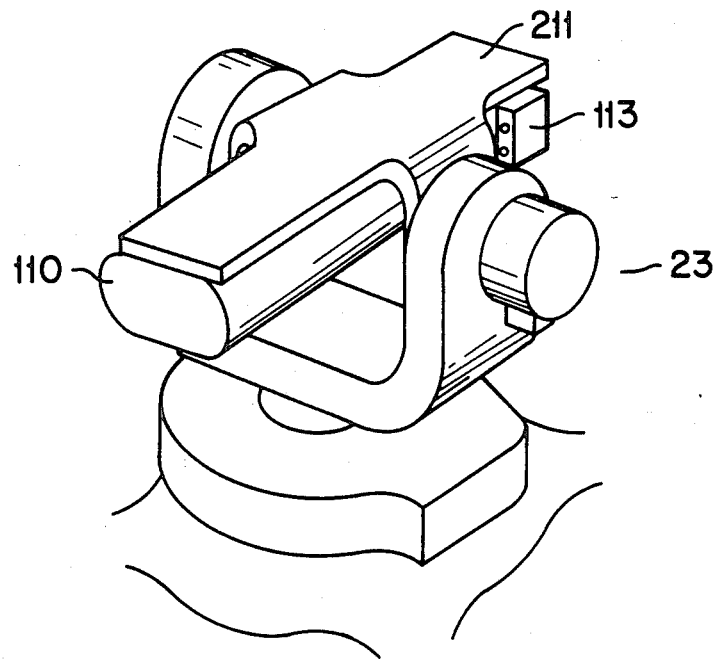
FIG. 4 is a perspective diagram of a gimbal of the type on which the light beam generating section and the light beam generating section are separately mounted.

In FIG. 1 is shown an exploded diagram of an interferometer system suitable for measuring the position of a movable component that is free to move in three dimensions. That system includes a light beam generating section 11 and a light beam reflecting section 12. In FIG. 2 is a perspective diagram of the light beam generating section mounted on an associated 2-axis gimbal 23 and in FIG. 3 is a perspective diagram of light beam reflecting section 12. Sections 11 and 12 are each mounted on an associated 2-axis gimbal of the same type as gimbal 23 shown in FIGS. 2 and 4. Each gimbal enables rotation about an elevation (EL) axis and azimuth (AZ) axis, thereby enabling both sections to rotate in order to preserve alignment even when reflecting section 12 moves freely in three dimensions. For generating section 11, rotation about the AZ axis is implemented by a motor 14 and a gear 15 and rotation about the EL axis is implemented by a motor 16 and a gear 17. The amount of rotation about the EL axis and the AZ axis is measured by an angle encoder 18 and an angle encoder 19, respectively.

Generating section 11 contains a light transducer 110 that includes a source of collimated, coherent light (such as a laser head) and a photodetector. Transducer 110 is attached to a fixed base 211 of gimbal 23. Transducer 110 produces a light beam 112 that is directed to an interferometer 113 such as the interferometer disclosed in U.S. Pat. No. 3,458,259 discussed previously. A first portion of the light beam is directed along a reference path within the interferometer and a second portion of the light beam travels along a path 114 to a reflector (such as cube corner 115) and then back to interferometer 113 where it is recombined with the first portion to produce an output beam 116. Output beam 116 is detected in transducer 110 to produce a signal that can be used to determine any change in the distance between reflector 115 and interferometer 113. A pair of masks 117 and 118 contain a set of holes 119-122 through which beam 114 passes when generating section 11 and reflecting section 12 are aligned.

An auxiliary source of collimated light, such as laser 123, produces a beam 124 that is utilized to maintain alignment between generating section 11 and reflecting section 12. A first portion of beam 124 reflects off of a beam splitter, such as half silvered mirror 125, to produce a beam 126. Beam 126 reflects off of a mirror 127 into a direction parallel to beam 114, passes through a pair of holes 128 and 129 in masks 117 and 118, respectively, and then is incident on a 4-direction detector 130 attached to the apex of cube corner 115.

Figure 14:
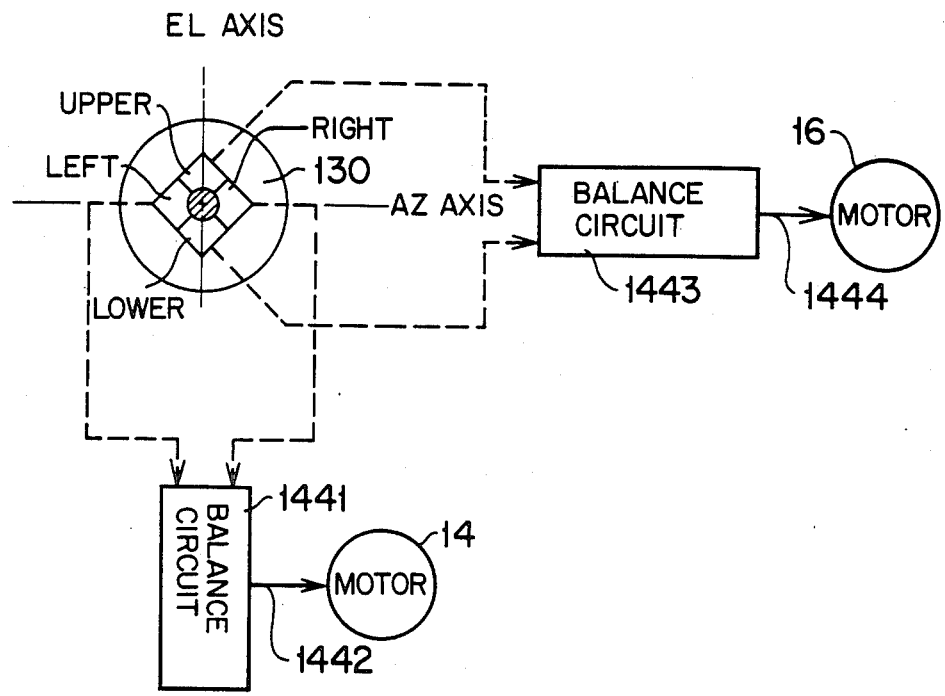
FIG. 14 shows servo loops for correcting misalignment of the generating section about its AZ and EL axes.

As shown in greater detail in FIG. 14, detector 130 contains an upper detector, a lower detector, a left detector and a right detector. A balance circuit 1441 is responsive to the output from the left and right detectors to produce an output signal 1442 utilized to control motor 14. A balance circuit 1443 is responsive to the output from the upper and lower detectors to produce an output signal 1444 urilized to control motor 16. These control signals adjust the orientation of section 11 about its EL and AZ axes to accurately and reproducibly direct beam 126 onto detector 130, thereby aligning section 11 to the location of section 12.

Figure 10:
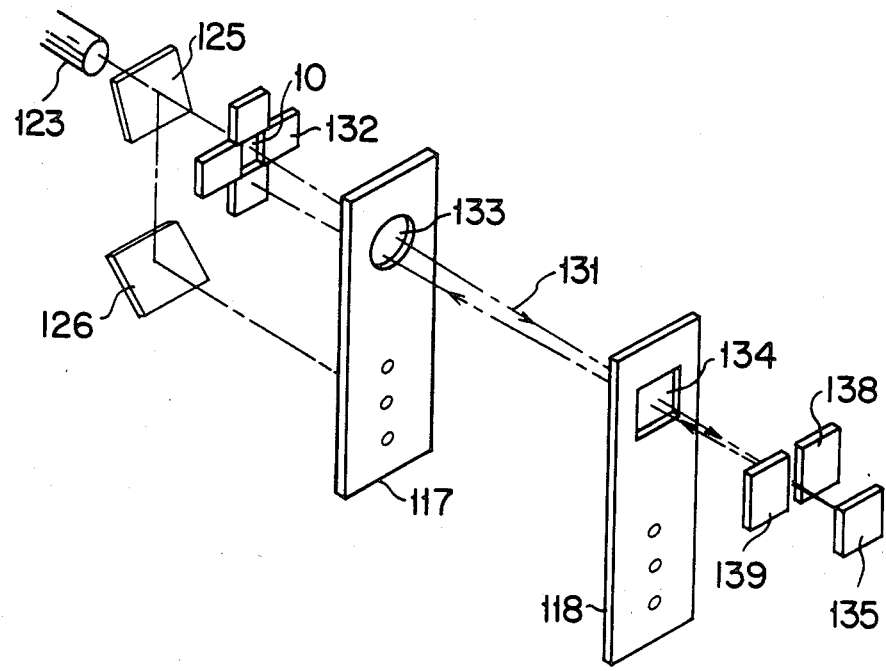

In order to reflect laer meam 114 accurately back to interferometer 113, reflecting section 12 must be properly aligned to the location of section 11. This alignment is achieved by use of a second portion of beam 124 that is transmitted through beam splitter 125 to form a beam 131 parallel to beam 114. Beam 131 passes through a hole 10 in the center of a 4-direction detector 132, a hole 133 in mask 117 and a hole 134 in mask 118 to a reflector, such as mirror 135. These elements are shown in greater detail in the perspective drawing of reflecting section 12 in FIG. 3 and in FIG. 10.

Figure 8:
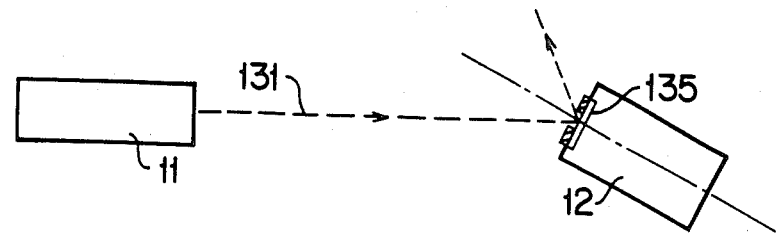
FIGS. 8 to 10 show the effects of a misalignment of the reflecting section about an elevation axis EL and an azimuthal axis AZ of the reflecting section.
Figure 9:
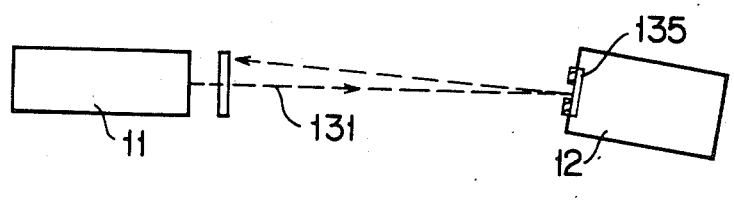
Figure 12:
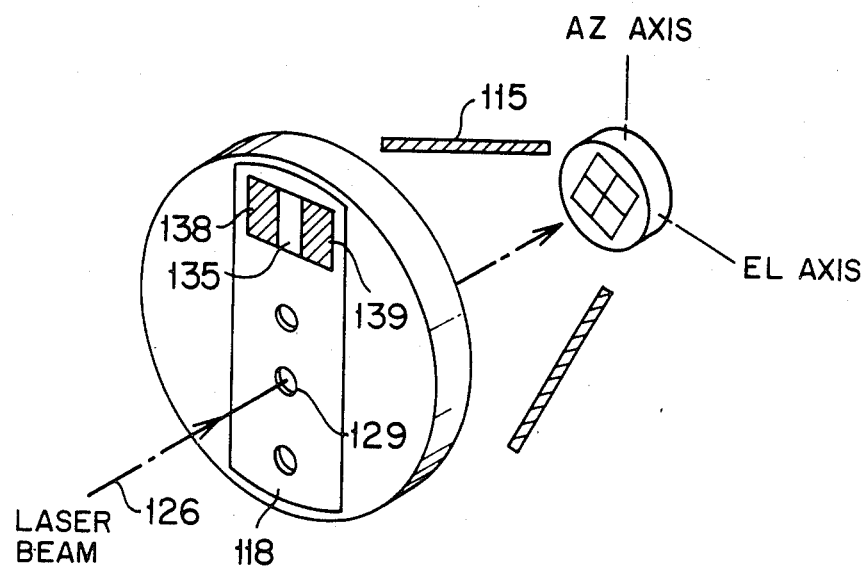
FIGS. 12 and 13 show circuitry for detecting misalignment of the generating section.

As illustrated in FIG. 8, when reflecting section 12 is not aligned to the position of generating section 11, beam 131 does not reflect back to the beam generating section 11. There must be sufficient prealignment between sections 11 and 12 that the servo loops are activated. In particular, beam 126 must be incident on 4-direction detector 130 and beam 131 must reflect back from reflector 135 to 4-direction detector 132. For example, FIG. 9 shows sufficient alignment that beam 131 reflects back from mirror 135 through hole 133 in mask 117 and FIG. 12 shows beam 126 passing through hole 129 to 4-direction detector 130. A pair of motors 136 and 137 adjust the orientation of reflecting section 12 about an AZ axis and an EL axis, respectively so that laser beams 114 and 131 are accurately reflected back to generating section 11.

Figure 11:
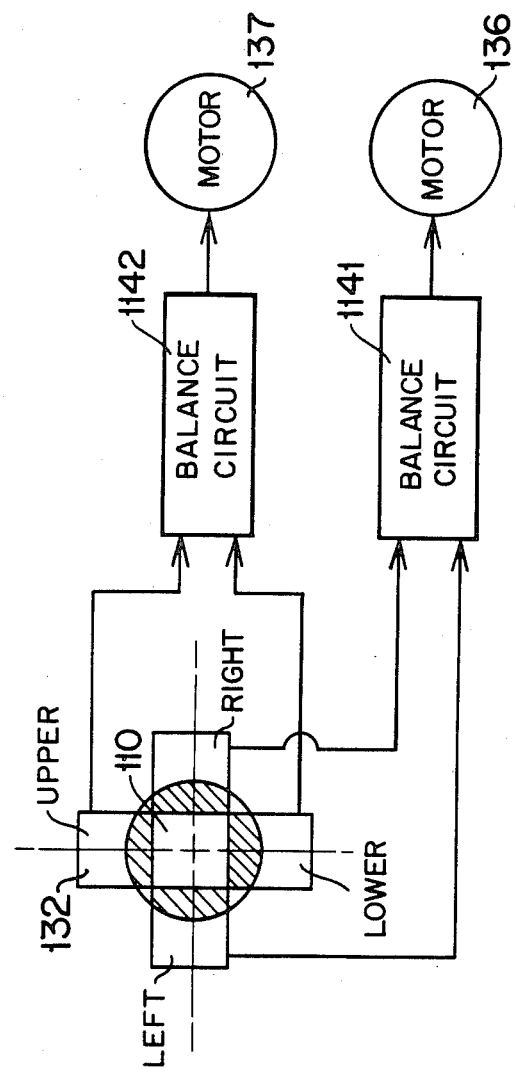
FIG. 11 shows servo loops for adjusting the reflecting section about its AZ and EL axes.

In FIG. 11 are shown 4-direction detector 132 and an associated pair of balance circuits 1142 and 1143 utilized to activate motors 136 and 137. Balance circuit 1141 is responsive to the outputs of a left detector and a right detector to produce a signal used to activate motor 136, thereby adjusting the angle of orientation of section 12 about its AZ axis. Similarly, balance circuit 1142 is responsive to the outputs of a top detector and a bottom detector to produce a signal used to activate motor 137, thereby adjusting the angle of orientation of section 12 about its EL axis.

Figure 5:
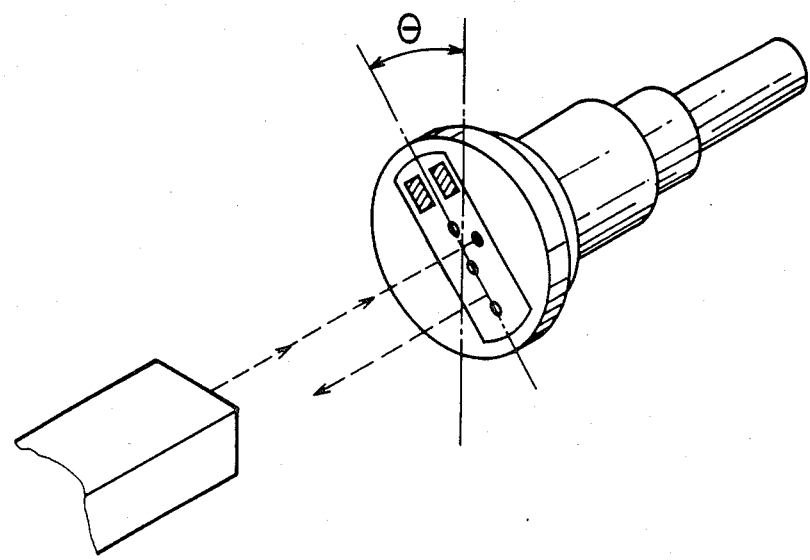
FIGS. 5-6, 7A, and 7B show the effects of a misalignment of the reflecting section about a longitudinal axis LO and also show a servo loop for correcting such misalignment.
Figure 6:
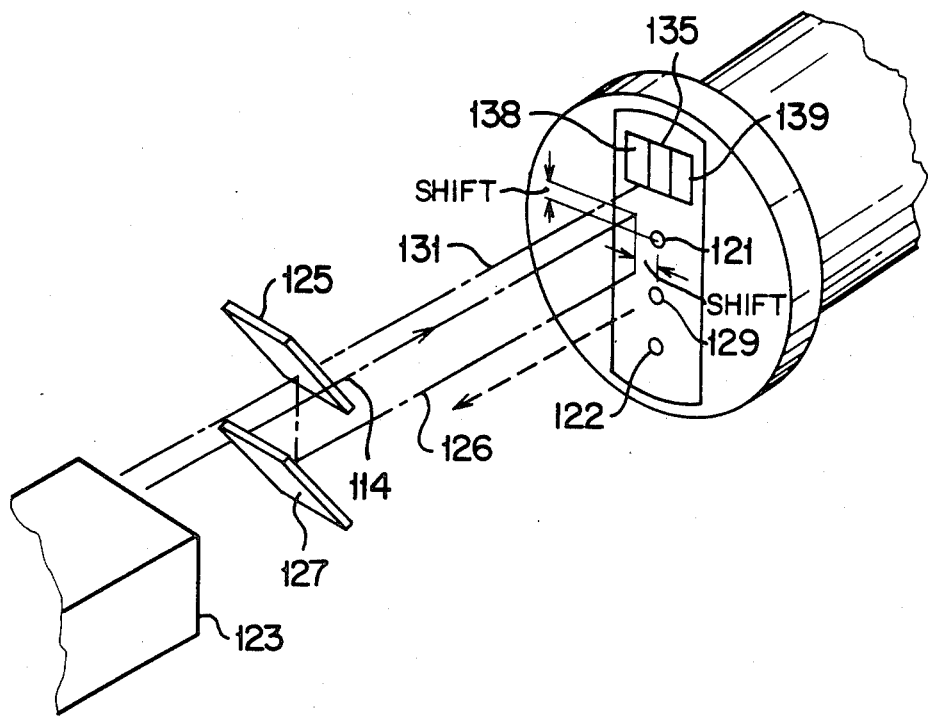
Figure 7A:
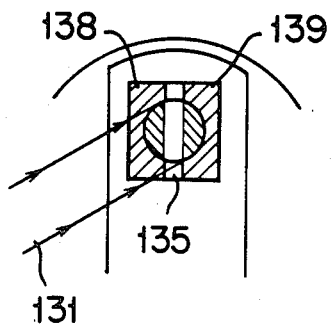
Figure 7B:
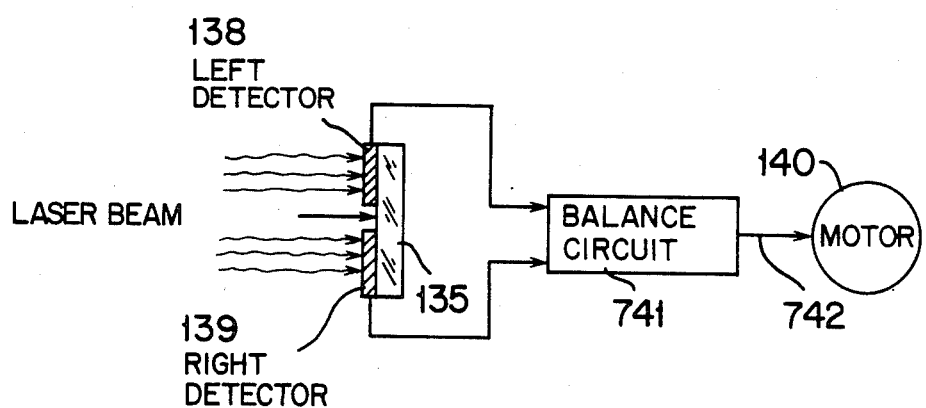
Figure 13:
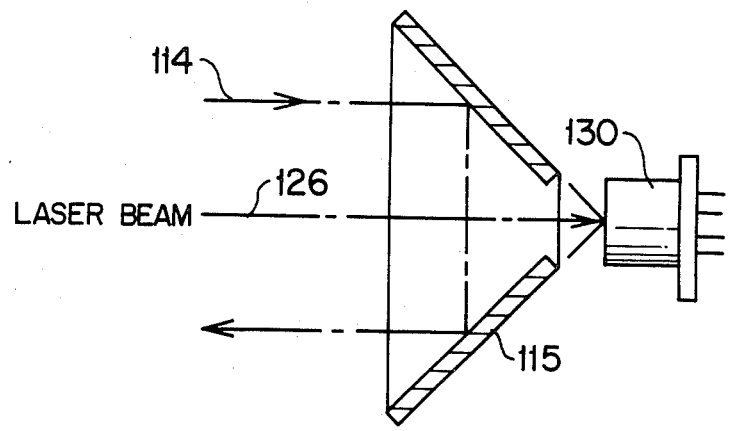

A pair of detectors 138 and 139 form a 2-direction detector that are utilized to activate a motor 140 to rotate reflector 115 about a longitudinal (LO) axis. This activation is illustrated in FIGS. 7A and 7B. In FIGS. 5 and 6, the effect of a rotation of section 12 about the LO axis is illustrated. Because mirror 135 and detectors 138 and 139 are not on axis LO, a rotation about axis LO produces both a horizontal and a vertical shift of beam 131 relative to detectors 138 and 139. The horizontal shift is utilized to change the amount of light striking detector 138 relative to that striking detector 139. As is illustrated in FIG. 7A, beam 131 overlaps onto both of detectors 138 and 139. A balance circuit 741 is responsive to the outputs of detectors 138 and 139 to produce a signal 742 utilized to activate motor 140. The path length of beam 114 (as shown in FIG. 13) varies as a function of the angle of rotation about the LO axis so that elements 138-140 are included to maintain a fixed point of incidence of beam 114 onto reflector 115. Typically, each balance circuit activates its associated motor until its two input signals are equal. However, all that is necessary, is that the balance circuits activate their associated motors until sections 11 and 12 are aligned.

The "distance" between generating section 11 and reflecting section 12 is defined to be the distance between a point P in section 11 and a point Q in section 12. The EL and AZ axes in section 11 are chosen to intersect at point P so that point P is not moved by a rotation about either the EL or AZ axes of section 11. Similarly, axes EL, AZ and LO in section 12 are chosen to intersect at point Q. In addition, points P and Q are chosen to have a separation vector $\underline{PQ0}$ that is parallel to beams 114, and 131.

Figure 15:
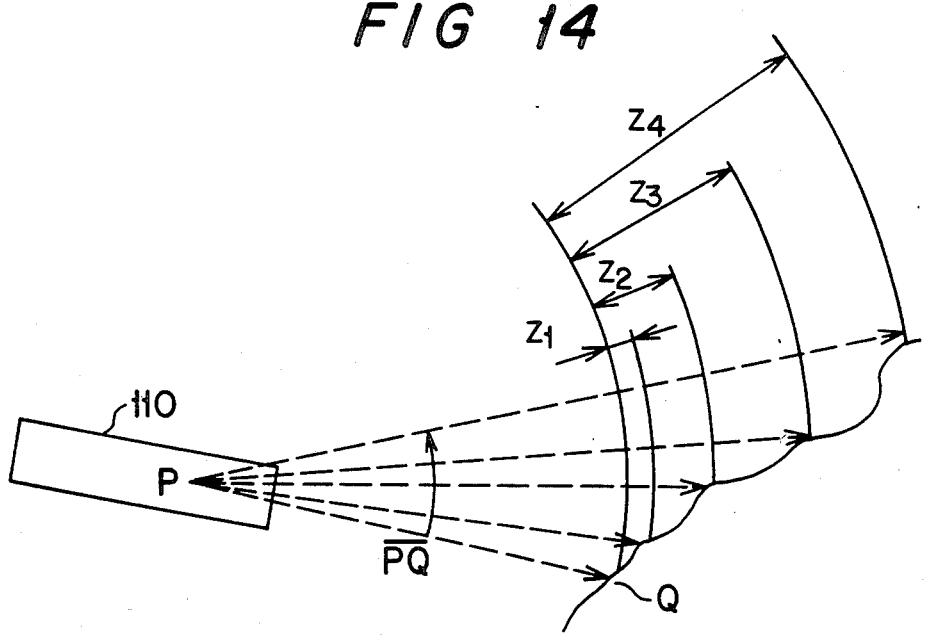
FIGS. 15-19 illustrate the determination of the absolute position of the light beam reflecting section.
Figure 18:
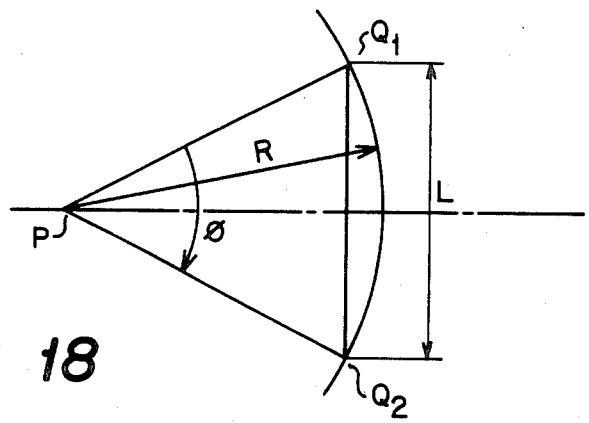
Figure 19:
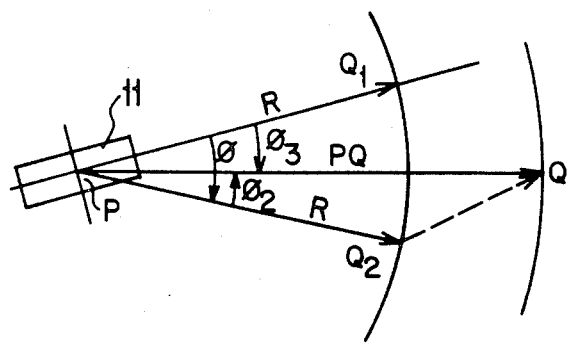
Figure 20:
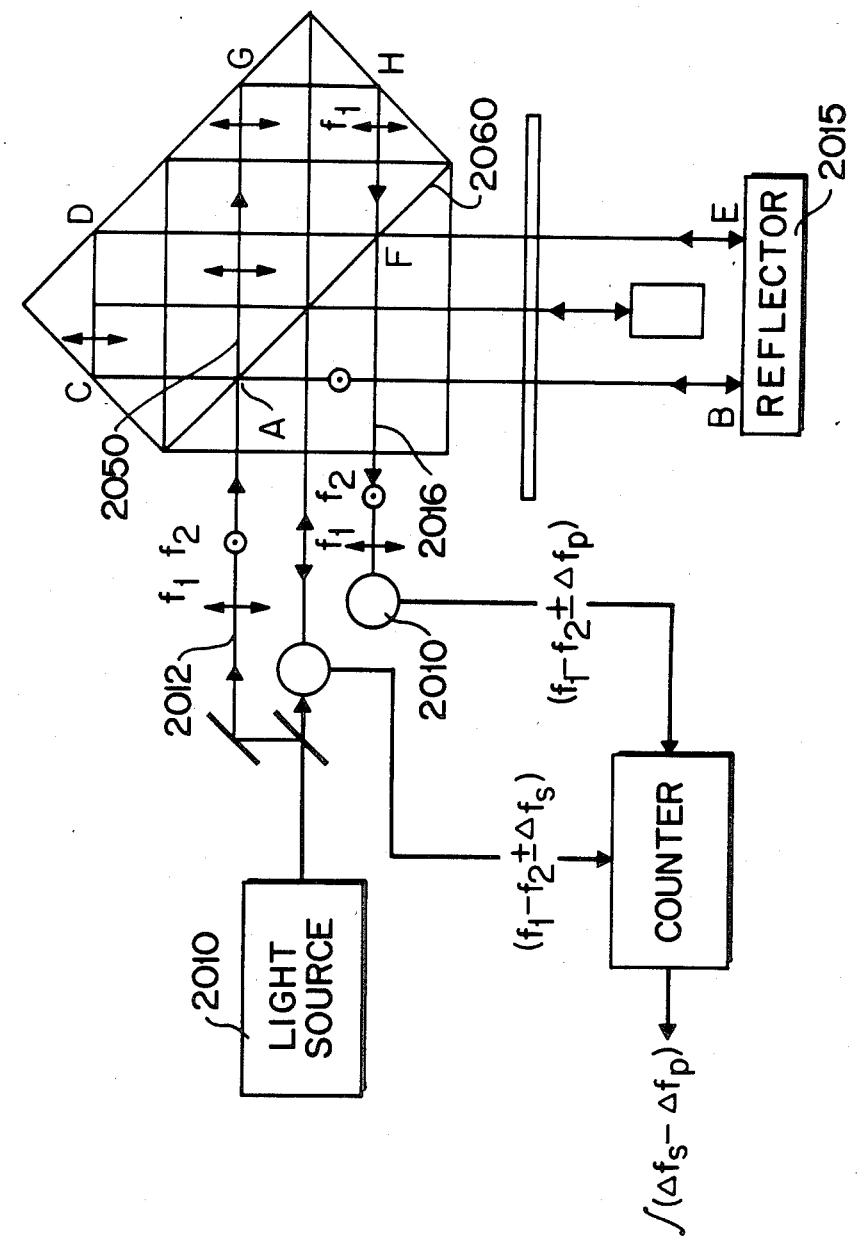
FIG. 20 shows a prior art interferometer.

As illustrated in FIG. 15, changes $Z_1$ to $Z_4$ in the distance between P and Q are determinable by the output signal from transducer 110. FIG. 18 illustrates a technique for determining the absolute distance R between points P and Q. The absolute position of point Q is then determined from R and the angles of rotation of section 11 about its EL and AZ axes, as determined by angle encoders 18 and 19. In order to determine R, point Q is translated a distance L from a first point $Q_1$ to a second point $Q_2$ that is the same distance R from point P as point $Q_1$ is from point P. As a result of this, points P, $Q_1$ and $Q_2$ form an isosceles triangle with its apex at point P. The distance L between points $Q_1$ and $Q_2$ and the angle $\phi$ at the apex of this triangle are measured. R is then calculated as $R = L*\sec(\phi/2)$.

Any method of measuring L is suitable for the above calculation of R. In order to retain the accuracy afforded by the use of an interferometer system, the measurement of L should be as accurate as the measurements of changes in the distance R and the angles of rotation about axes EL and AZ of section 11. This suggests the use of an auxiliary laser/interferometer system for use in measuring L.

Figure 16:
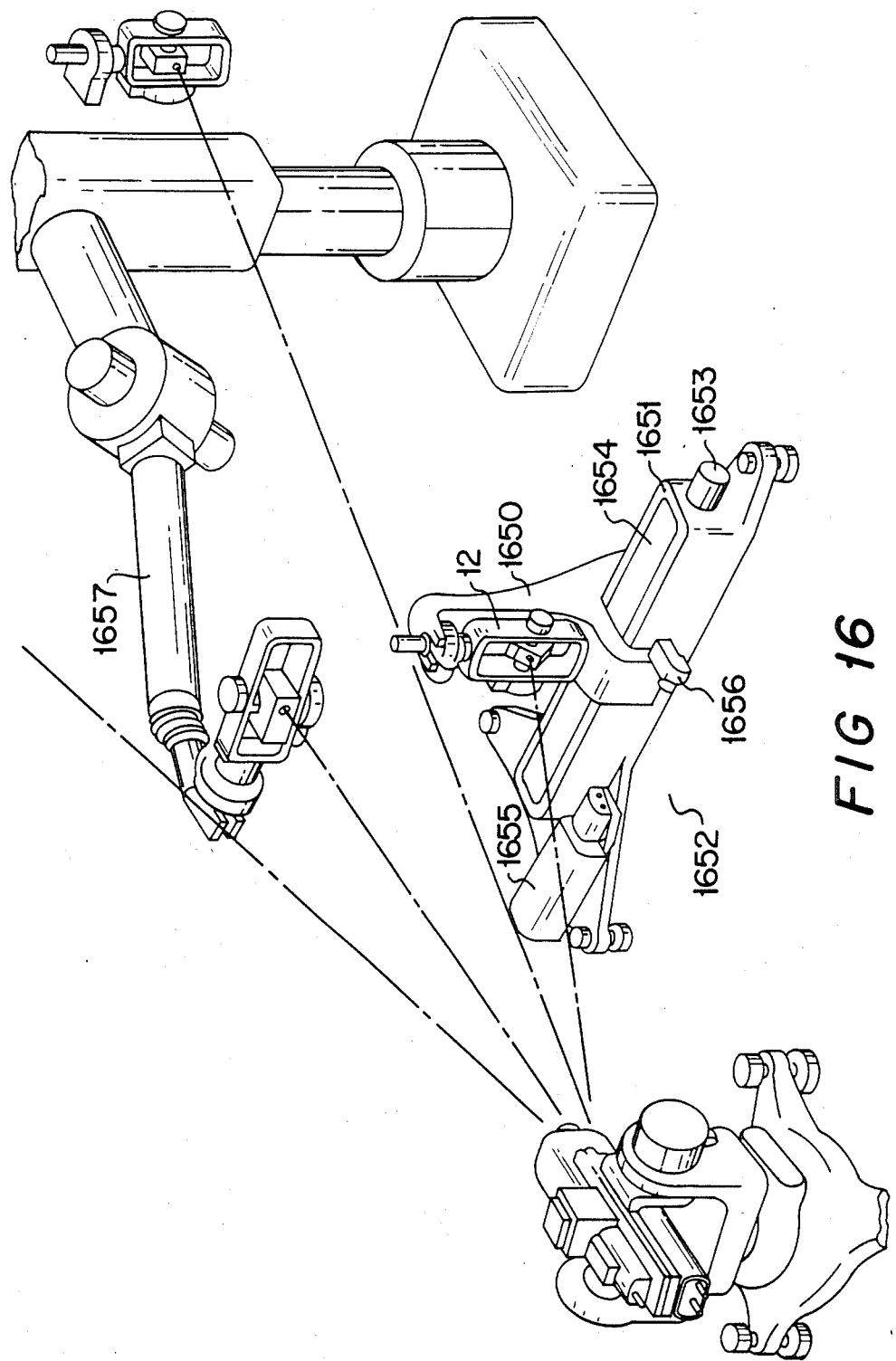
Figure 17:
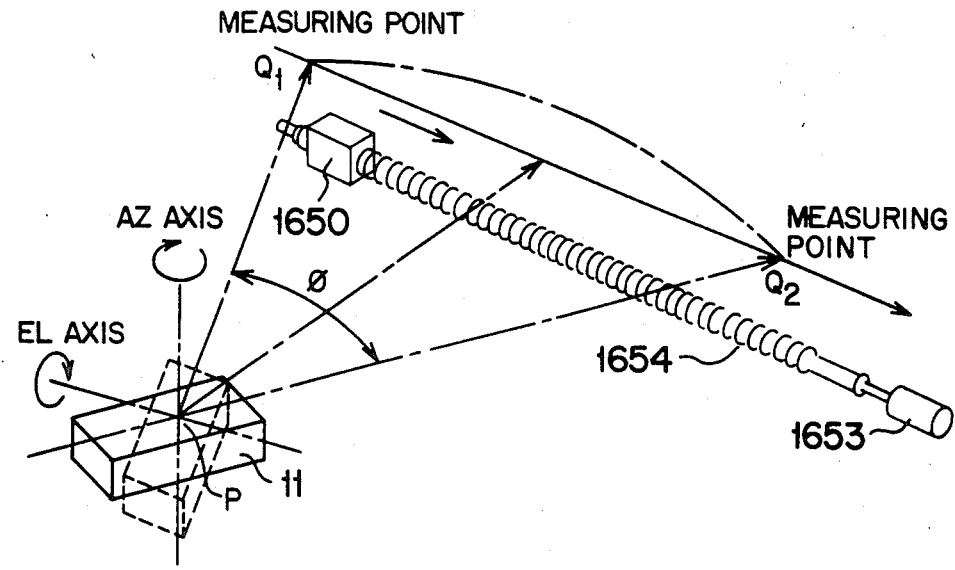

In FIG. 16, one method of measuring R is presented. In that method, reflecting section 12 is mounted on a movable stage 1650 that slides in a fixed base 1651 of a test fixture 1652. A motor 1653 is coupled by a screw 1654 to movable stage 1650 to translate section 12. A laser transducer/interferometer 1655 is attached to base 1651 and reflects a laser beam off of a reflector 1656 attached to movable stage 1650 in order to measure L. Preferably, fixed base 1651 is oriented so that the angle of rotation about the EL axis of section 11 is constant so that the angle $\phi$ is determined directly from the output of angle encoder 19. If this is not the case, then $\phi$ is determined by well known trigonometric relations that determine between $\phi$ as a function of the angles of rotation measured by angle encoders 18 and 19.

Once R is known for points $Q_1$ and $Q_2$, the absolute position of Q for any other location of section 12 can be determined by measuring the change in R and the changes in the angles of rotation about axes EL and AZ of section 11 as section 12 is moved from point $Q_2$ to some arbitrary location Q. Therefore, while the system is activated to retain alignment between sections 11 and 12 and to measure the changes in R and the angles of rotation about the EL and AZ axes of section 11, section 11 is moved to a point Q of interest. For example, section 12 can be moved from test fixture 1652 to a robot arm 1657 to enable determination of the absolute position of the robot arm.

We claim:

1. An improved interferometer of the type in which beam generating section having a first source of coherent collimated light produces a first beam of light that is divided at a first beam splitter into a reference beam that is directed along a reference path and a test beam that is directed in a variable first direction to a movable reflecting section, said movable reflecting section directing the test beam back to a point F at which the reference and test beams are recombined to produce an interfering output beam, said improvement comprising:
   means for controlling the first direction so that the test beam is incident on the movable reflecting section even when the movable reflector section is translated freely in three dimensions;
   means for controlling the movable reflecting section so that said test beam is directed back to point F even when the movable reflecting section is translated freely in three dimensions; and
   means for measuring the direction of the test beam.

2. An interferometer as in claim 1 wherein said means for controlling the first direction comprises:
   a first detector, within the reflecting section, that is responsive to a beam of light emitted from the generating section in the first direction; and
   first beam directing means within the generating section and responsive to the first detector for controlling the first direction.

3. An interferometer as in claim 2 wherein said beam generating section further comprises an auxiliary source of collimated light that produces the beam to which said first detector is responsive.

4. An interferometer as in claim 2 wherein said reflecting section further comprises a first reflector on which the test beam is to be directed and wherein the first detector is rigidly attached to the first reflector.

5. An interferometer as in claim 4 wherein the first reflector is a cube corner having an apex at which the first detector is attached.

6. An improved interferometer of the type is which a beam generating section having a first source of coherent collimated light produces a first beam of light that is divided at a first beam splitter into a reference beam that is directed along a reference path and a test beam that is directed in a variable first direction to a movable reflecting section, said movable reflecting section directing the test beam back to a point F at which the reference and test beams are recombined to produce an interfering output beam, said improvement comprising:
   means for controlling the first direction so that the test beam is incident on the movable reflecting section even when the movable reflecting section is translated freely in three dimensions; and
   means for controlling the movable reflecting section so that said test beam is directed back to point F even when the movable reflecting section is translated freely in three dimensions;
   said means for controlling the first direction comprising:
   a first detector, within the reflecting section, that is responsive to a beam of light emitted from the generating section in the first direction; and
   first beam directing means within the generating section and responsive to the first detector for controlling the first direction;
   wherein the beam directing means comprises a first gimbal having at least two rotation axes, said beam directing means being mounted on said first gimbal.

7. An improved interferometer of the type in which a beam generating section having a first source of coherent collimated light produces a first beam of light that is divided at a first beam splitter into a reference beam that is directed along a reference path and a test beam that is directed in a variable first direction to a movable reflecting section, said movable reflecting section directing the test beam back to a point F at which the reference and test beams are recombined to produce an interfering output beam, said improvement comprising:
   means for controlling the first direction so that the test beam is incident on the movable reflecting section even when the movable reflecting section is translated freely in three dimensions; and
   means for controlling the movable reflecting section so that said test beam is directed back to point F even when the movable reflecting section is translated freely in three dimensions;
   said means for controlling the first direction comprising:
      a first detector, within the reflecting section, that is responsive to a beam of light emitted from the generating section in the first direction; and
      first beam directing means within the generating section and responsive to the first detector for controlling the first direction;
   wherein the beam directing means comprises a first gimbal having at least two rotation axes, said beam directing means being mounted on said first gimbal.

8. An improved interferometer of the type in which a beam generating section having a first source of coherent collimated light produces a first beam of light that is divided at a first beam splitter into a reference beam that is directed along a reference path and a test beam that is directed in a variable first direction to a movable reflecting section, said movable reflecting section directing the test beam back to a point F at which the reference and test beams are recombined to produce an interfering output beam, said improvement comprising:
   means for controlling the first direction so that the test beam is incident on the movable reflecting section even when the movable reflecting section is translated freely in three dimensions; and
   means for controlling the movable reflecting section so that said test beam is directed back to point F even when the movable reflecting section is translated freely in three dimensions;
   wherein said reflecting section returns the test beam along a second direction to the generating section and wherein said means for controlling the generating section comprises:
   a second detector, within the generating section, that is responsive to a beam of light emitted from the reflecting section in the second direction; and
   second beam directing means within the reflecting section and responsive to the second detector for controlling the second direction.

9. An interferometer as in claim 8 wherein said beam generating section further comprises an auxiliary source of collimated light that produces the beam to which said second detector is responsive; and
   wherein said reflecting section further comprises a second reflector that reflects the beam from the auxiliary source into the second direction.

10. An interferometer as in claim 8 wherein the second beam directing means comprises a second gimbal having at least two rotation axis, and a second beam deflector mounted on said second gimbal.

11. An interferometer as in claim 8 wherein the second beam directing means comprises a second gimbal having at least two rotation axes, said beam reflecting section being mounted on said second gimbal.

12. An improved interferometer of the type in which a beam generating section having a first source of coherent collimated light produces a first beam of light that is divided at a first beam splitter into a reference beam that is directed along a reference path and a test beam that is directed in a variable first direction to a movable reflecting section, said movable reflecting section directing the test beam back to a point F at which the reference and test beams are recombined to produce an interfering output beam, said improvement comprising:
   means for controlling the first direction so that the test beam is incident on the movable reflecting section even when the movable reflecting section is translated freely in three dimensions; and
   means for controlling the movable reflecting section so that said test beam is directed back to point F even when the movable reflecting section is translated freely in three dimensions;
   means for measuring a pair of directional angles that determine the first direction.

13. An improved interferometer of the type in which a beam generating section having a first source of coherent collimated light produces a first beam of light that is divided at a first beam splitter into a reference beam that is directed along a reference path and a test beam that is directed in a variable first dirction to a movable reflecting section, said movable reflecting section directing the test beam back to a point F at which the reference and test beams are recombined to produce an interfering output beam, said improvement comprising:
   means for controlling the first direction so that the test beam is incident on the movable reflecting section even when the movable reflecting section is translated freely in three dimensions; and
   means for controlling the movable reflecting section so that said test beam is directed back to point F even when the movable reflecting section is translated freely in three dimensions;
   means for moving the reflecting section between a pair of points Q1 and Q2 equidistant from the generating section;
   means for measuring the distance between points Q1 and Q2; and
   means for measuring the angle subtended at the generating section between point Q1 and Q2.

* * * * *